(12) United States Patent
Mukherjee et al.

(10) Patent No.: US 12,034,963 B2
(45) Date of Patent: *Jul. 9, 2024

(54) COMPOUND PREDICTION FOR VIDEO CODING

(71) Applicant: GOOGLE LLC, Mountain View, CA (US)

(72) Inventors: Debargha Mukherjee, Cupertino, CA (US); James Bankoski, Los Gatos, CA (US); Yue Chen, Kirkland, WA (US); Yuxin Liu, Palo Alto, CA (US); Sarah Parker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,470

(22) Filed: Apr. 28, 2022

(65) Prior Publication Data

US 2022/0256186 A1    Aug. 11, 2022

Related U.S. Application Data

(63) Continuation of application No. 17/073,892, filed on Oct. 19, 2020, now Pat. No. 11,343,528, which is a
(Continued)

(51) Int. Cl.
*H04N 11/02*      (2006.01)
*H04N 19/105*     (2014.01)
(Continued)

(52) U.S. Cl.
CPC ......... *H04N 19/517* (2014.11); *H04N 19/105* (2014.11); *H04N 19/136* (2014.11);
(Continued)

(58) Field of Classification Search
CPC .. H04N 19/517; H04N 19/105; H04N 19/136; H04N 19/139; H04N 19/176; H04N 19/182; H04N 19/46
(Continued)

(56) References Cited

U.S. PATENT DOCUMENTS 6,816,552 B2   11/2004   Demos
7,233,621 B2    6/2007   Jeon
(Continued)

FOREIGN PATENT DOCUMENTS

CN    101902646 A    12/2010
WO    2016/072775 A1   5/2016

OTHER PUBLICATIONS

Bankoski et al., "VP8 Data Format and Decoding Guide", Independent Submission RFC 6389, Nov. 2011, 305 pp.
(Continued)

*Primary Examiner* — Jayanti K Patel
*Assistant Examiner* — Richard B Carter
(74) *Attorney, Agent, or Firm* — Young Basile Hanlon & MacFarlane, P.C.

(57) ABSTRACT

Generating a compound predictor block for a current block of video includes generating, for the current block, a first predictor block using one of inter-prediction or intra-prediction and generating a second predictor block. The first predictor block includes a first pixel and the second predictor block includes a second pixel that is co-located with the first pixel. A first weight is determined for the first pixel using a difference between a value of the first pixel and a value of the second pixel. A second weight is determined for the second pixel using the first weight. The compound predictor block is generated by combining the first predictor block and the second predictor block. The compound predictor block includes a weighted pixel that is determined
(Continued)

using a weighted sum of the first pixel and the second pixel using the first weight and the second weight.

20 Claims, 10 Drawing Sheets

Related U.S. Application Data continuation of application No. 15/807,653, filed on Nov. 9, 2017, now Pat. No. 10,827,196.

(60) Provisional application No. 62/445,999, filed on Jan. 13, 2017.

(51) Int. Cl.
| | |
|---|---|
| *H04N 19/136* | (2014.01) |
| *H04N 19/139* | (2014.01) |
| *H04N 19/176* | (2014.01) |
| *H04N 19/182* | (2014.01) |
| *H04N 19/46* | (2014.01) |
| *H04N 19/517* | (2014.01) |

(52) U.S. Cl.
CPC ......... *H04N 19/139* (2014.11); *H04N 19/176* (2014.11); *H04N 19/182* (2014.11); *H04N 19/46* (2014.11)

(58) Field of Classification Search
USPC ........... 375/240.14, E7.148, E7.125, 240.02; 382/309
See application file for complete search history.

(56) References Cited

U.S. PATENT DOCUMENTS

| | | | |
|---|---|---|---|
| 7,266,150 B2 | 9/2007 | Demos | |
| 7,308,145 B2 | 12/2007 | Abe et al. | |
| 7,310,373 B2 | 12/2007 | Kondo et al. | |
| 7,564,902 B2 | 7/2009 | Sasai et al. | |
| 7,570,691 B2 | 8/2009 | Jeon | |
| 7,606,307 B2 | 10/2009 | Jeon | |
| 8,144,786 B2 | 3/2012 | MacDonald Boyce | |
| 8,295,354 B2 | 10/2012 | Boyce | |
| 8,315,309 B2 | 11/2012 | Min et al. | |
| 8,320,464 B2 | 11/2012 | Raveendran et al. | |
| 8,559,513 B2 | 10/2013 | Demos | |
| 8,699,572 B2 | 4/2014 | Demos | |
| 8,761,257 B2 | 6/2014 | Demos | |
| 8,891,624 B2 | 11/2014 | Jeon | |
| 8,953,679 B2 | 2/2015 | Kim et al. | |
| 9,374,578 B1 | 6/2016 | Mukherjee et al. | |
| 9,992,497 B2 | 6/2018 | Kim et al. | |
| 10,116,957 B2* | 10/2018 | Xu | H04N 19/13 |
| 10,165,283 B1 | 12/2018 | Chen et al. | |
| 10,404,989 B2* | 9/2019 | Xu | H04N 19/147 |
| 11,343,528 B2* | 5/2022 | Mukherjee | H04N 19/176 |
| 2005/0013360 A1* | 1/2005 | Kim | H04N 19/184 |
| | | | 375/E7.148 |
| 2005/0240245 A1 | 10/2005 | Bange et al. | |
| 2007/0098067 A1 | 5/2007 | Kim et al. | |
| 2008/0240245 A1* | 10/2008 | Lee | H04N 19/147 |
| | | | 375/E7.125 |
| 2009/0257492 A1 | 10/2009 | Andersson et al. | |
| 2014/0205000 A1* | 7/2014 | Lee | H04N 19/182 |
| | | | 375/240.02 |
| 2015/0063726 A1* | 3/2015 | Matsumoto | G06T 5/008 |
| | | | 382/309 |
| 2016/0227215 A1* | 8/2016 | Srinivasan | H04N 19/52 |

OTHER PUBLICATIONS

Bankoski et al., "VP8 Data Format and Decoding Guide draft-bankoski-vp8-bitstream-02", Network Working Group, Internet-Draft, May 18, 2011, 288 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
Bankoski, et al., "Technical Overview of VP8, An Open Source Video Codec for the Web", Jul. 11, 2011, 6 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
"VP8 Data Format and Decoding Guide, WebM Project", Google On2, Dec. 1, 2010, 103 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
Dai, et al., "Multichannel Nonlocal Means Fusion for Color Image Denoising," IEEE Transactions on Circuits and Systems for Video Technology, vol. 23, No. 11, Nov. 2013, pp. 1873-1886.
International Search Report and Written Opinion in PCT/US2017/059266, mailed Jan. 17, 2018.

* cited by examiner

COMPOUND PREDICTION FOR VIDEO CODING

CROSS-REFERENCE TO RELATED APPLICATIONS

This application is a continuation of U.S. patent application Ser. No. 17/073,892, filed on Oct. 19, 2020, which is a continuation of U.S. patent application Ser. No. 15/807,653, filed on Nov. 9, 2017, which claims the benefit of U.S. Provisional Patent Application Ser. No. 62/445,999, filed on Jan. 13, 2017, the entire disclosures of which are incorporated herein by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more predictor blocks of reference frames. Differences (i.e., residual errors) between blocks and predictor blocks are compressed and encoded in a bitstream. A decoder uses the differences and the reference frames to reconstruct the frames or images.

SUMMARY

The disclosure relates in general to video coding, and in particular to compound prediction modes for video coding.

An aspect of the disclosed implementations is a method for generating a compound predictor block of a current block of video. The method includes generating, for the current block, a first predictor block using one of inter-prediction or intra-prediction, where the first predictor block includes a first pixel; generating, for the current block, a second predictor block that includes a second pixel that is co-located with the first pixel; determining a first weight for the first pixel using a difference between a value of the first pixel and a value of the second pixel; determining a second weight for the second pixel using the first weight; and generating the compound predictor block by combining the first predictor block and the second predictor block, where the compound predictor block includes a weighted pixel that is determined using a weighted sum of the first pixel and the second pixel using the first weight and the second weight.

An aspect of the disclosed implementations is an apparatus for generating a compound predictor block for a current block. The apparatus includes a processor that is configured to generate, for the current block, a first predictor block using one of inter-prediction or intra-prediction and that includes a first pixel; generate, for the current block, a second predictor block that includes a second pixel that is co-located with the first pixel; determine a first weight for the first pixel using a difference between a value of the first pixel and a value of the second pixel; determine a second weight for the second pixel using the first weight; and generate the compound predictor block by combining the first predictor block and the second predictor block, where the compound predictor block includes a weighted pixel that is determined using a weighted sum of the first pixel and the second pixel using the first weight and the second weight, respectively.

An aspect of the disclosed implementations is a non-transitory computer-readable storage medium, comprising executable instructions that, when executed by a processor, facilitate performance of operations that include generating, for a current block, a first predictor block that is generated using one of inter-prediction or intra-prediction and includes a first pixel; generating, for the current block, a second predictor block that includes a second pixel that is co-located with the first pixel; determining a first weight for the first pixel using a difference between a value of the first pixel and a value of the second pixel; determining a second weight for the second pixel using the first weight; and generating a compound predictor block by combining the first predictor block and the second predictor block. The compound predictor block includes a weighted pixel that is determined using a weighted sum of the first pixel and the second pixel using the first weight and the second weight, respectively.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
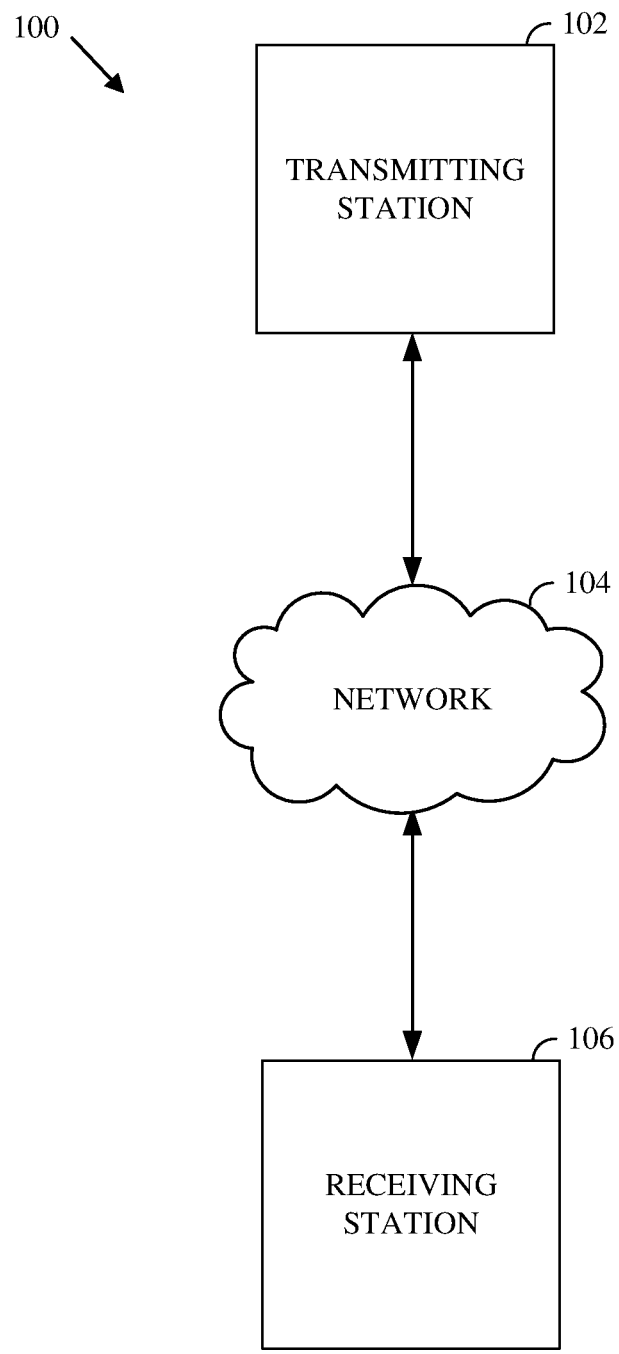
FIG. 1 is a schematic of a video encoding and decoding system.

As mentioned above, compression schemes related to coding video streams may include breaking images (i.e., original or source images) into blocks and generating a digital video output bitstream using one or more techniques to limit the information included in the output. A received encoded bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between previously coded pixel values and those in the current block. In this way, only the residual and parameters used to generate the residual need be added to the encoded bitstream. The residual may be encoded using a lossy quantization step. Decoding (i.e., reconstructing) an encoded block from such a residual often results in a distortion between the original and the reconstructed block.

Encoding using spatial similarities is known as intra prediction. Using an intra-prediction mode, intra prediction can attempt to predict the pixel values of a current block of a current frame of a video stream using pixels peripheral to the current block. The pixels peripheral to the current blocks are pixels within the current frame but that are outside the current block. The pixels peripheral to the block can be pixels adjacent to the current block. Which pixels peripheral to the block are used can depend on the intra-prediction mode and/or a scan order of the blocks of a frame. For example, in a raster scan order, peripheral pixels above a current block (i.e., the block being encoded or decoded) and/or peripheral pixels to the left of the current block may be used.

Encoding using temporal similarities is known as inter prediction. Inter prediction uses a motion vector that represents the temporal displacement of a previously coded block relative to the current block. The motion vector can be identified using a method of motion estimation, such as a motion search. In the motion search, a portion of a reference frame can be translated to a succession of locations to form a predictor block that can be subtracted from a portion of a current frame to form a series of residuals. The horizontal and/or vertical translations corresponding to the location having, e.g., the smallest residual can be selected as the motion vector. The motion vector can be encoded in the encoded bitstream along with an indication of the reference frame.

In some situations, and to minimize the residual further, more than one predictor block can be combined to form a compound predictor to predict a current block. This is known as compound prediction. Compound prediction can reduce, sometimes significantly, the residual generated for a block to be coded.

A compound predictor can be created by combining two or more predictors determined using an inter prediction, intra prediction, or both. For example, a compound predictor can be generated by combining an intra-generated predictor and an inter-generated predictor (i.e., intra+inter), by combining two intra-generated predictor blocks (i.e., intra+intra), or by combining two inter-generated predictor blocks (i.e., inter+inter). For example, compound inter frame prediction can employ a first motion vector to obtain a first predictor block from a first block of a first frame and a second motion vector to obtain a second predictor block from a second block of a second frame. The first frame and the second frame are reference frames. The reference frames can both be in the past, both in the future, or some combination of post and future frames. The second motion vector can be independent of, or derived from, the first motion vector. An encoder can then convey (e.g., encode in an encoded bitstream) the first motion vector, the second motion vector, the first reference, and the second reference frame to a decoder.

In forming a compound predictor (e.g., in the case of two predictor blocks), a video codec (i.e., an encoder and/or a decoder) may combine co-located pixels of a first predictor block and pixels of a second predictor block. For example, to obtain a pixel value for a pixel of the compound predictor block that is located at pixel position (row=r, column=c) of the compound predictor block, the video codec combines a first pixel value for a first pixel located at position (r, c) in the first predictor block with a second pixel value of a second pixel located at the position (r, c) in the second predictor block.

The combining can use the same weight mask for all pixels of the compound predictor block. That is, using a mask $\{w1, (1-w1)\}$, the weight w1 is applied to each pixel value of the first predictor block and the weight $(1-w1)$ is applied to each pixel value of the second predictor block using equation (1):

$$\text{current}[r][c] = p1[r][c]*w1 + p2[r][c]*(1-w1) \quad (1)$$

In equation (1), current[r][c] is the pixel value of the pixel of the compound predictor block at position (r, c), p1[r][c] is the co-located pixel value in the first predictor block, and p2[r][c] is the co-located pixel value in the second predictor block. In an example, the pixels from the first predictor block and the second predictor block are weighted equally using the mask $\{\frac{1}{2}, \frac{1}{2}\}$. In the mask $\{w1, (1-w1)\}$, the weight w1 can be referred to herein as the baseline weight and the weight $(1-w1)$ can be referred to as the complementary baseline weight. Where more than two predictor blocks are used, the mask can contain more weights (i.e., weight values). For example, the mask can include, explicitly or implicitly, a weight for each of the predictor blocks. The weights of the mask can add up to 1.

In another example, the weights can vary based on a partitioning the first predictor block and a partitioning of the second predictor block. For example, the partitioning can be based on detecting edges in the first and second predictor blocks. In another example, the partitioning can be based on a partitioning of the first and second predictor blocks into quadrants or halves. The weights can be assigned based on which partition the first pixel value falls within in the first predictor block, which partition the second pixel value falls within in the second predictor block, or a combination thereof. As such, the weighting may be spatially based (i.e., based on the position of a pixel). For example, in a case where the predictor blocks are partitioned into left sides and right sides, it may be that the left side of the first predictor block is a better predictor of the left side of the current block than the left side of the second predictor block. As such, pixel positions within the left side of the first predictor block may have a higher weighting. In any case, indications of the mask (i.e., the weight values) can be transmitted from the encoder to a decoder in the encoded bitstream. In an example, the indication of the mask may be transmitted implicitly. For example, the encoder and the decoder may be configured, a priori, to use a specific mask (e.g., the mask $\{0.75, 0.25\}$). As such, the encoder need not encode the mask in the encoded bitstream. Encoding the mask can mean encoding the values of the mask or quantized values of the mask. Encoding the mask can mean encoding an indication of the mask. Similarly, decoding the mask can mean decoding an indication of the mask. For example, the indication can be a mask index, as described below.

In implementations of this disclosure, compression performance may be improved by deriving the weights and/or by modulating the weights to be applied to pixels of the predictor blocks when generating a compound predictor using the values of the pixels of the predictor blocks themselves.

For example, as further illustrated below, the modulation values and/or weights to be applied to the pixels of the first predictor and the second predictor can be generated using a comparison (e.g., a difference) of the pixels of the predictor blocks.

For example, as further illustrated below, if a baseline weight w1 is to be used with a first predictor block, then modulation values can be determined using at least a subset of the pixels of the first predictor block. The modulation values can be applied to the baseline weight w1 when combining the predictor blocks to generate the compound predictor block. Different modulation values can be generated for each pixel of the first predictor block (and the second predictor block) using pixels of the first predictor block (and using the pixels of the second predictor block). Using pixels of the first predictor block means using the values of the pixels of the first predictor block.

A codec can determine, at least partially, the weights to be applied for a compound prediction based on the pixel values of the predictor blocks. As a decoder can exactly recreate the predictor blocks using information conveyed by the encoder in the encoded bitstream, the same weights (i.e., derived weights) and the same final compound predictor block can be generated by the decoder without additional information relating to the weights to be applied to the pixels of the predictor blocks. Baseline weights (e.g., default, initial, average weights) can be conveyed in the encoded bitstream and the decoder can use the derived weights (i.e., modulation values) to modulate (i.e., adjust) the baseline weights.

As stated above, different weights can be used for each pixel and the weights can depend on the prediction signals (e.g., the pixel values of a predictor block) themselves. "Prediction signal" includes information indicative of at least one pixel value. A "pixel value" includes a value associated with a pixel, such as a color or luminosity. The different weights can be modulated (i.e., adjusted) weights of some base weight (i.e., a baseline weight). The baseline weight can be a weight that applies to each of the pixels of the predictor block. Contrastingly, a modulated weight is a weight that is calculated for a pixel. The disclosure herein applies equally to chrominance and luminance components and/or the red-green-blue (RGB) components of a pixel. That is, for example, modulated weights can be calculated for the chrominance components; and the same or different modulated weights can be determined for the chrominance components.

In the case of an inter-inter compound predictor block, given a first motion vector and a second motion vector, the first predictor block and the second predictor block can be respectively generated from a first reference frame and a second reference frame. The weights applied to the pixels of the first predictor block and the weights applied to the pixels of the second predictor block can depend on the nature (e.g., the pixel values) of the first predictor block and the second predictor block themselves. While two predictor blocks (i.e., a first predictor block and a second predictor block) are used herein, the teachings of this disclosure are not so limited. Any number of predictor blocks can be used for the dependent compound prediction modes for video coding.

As further described below, the encoder can convey, and the decoder can receive and use, additional information in the encoded bitstream to guide the weight generation process of the decoder. The weight generation process is the process of determining which respective weights to apply to pixels of the predictor blocks when the pixels of predictor blocks are combined via compound prediction. The additional information can include none, one, or more of a direction of adjustment of a baseline weight, whether to use a complementary mask, and one or more peak pixel values for at least some of the predictor blocks.

The direction of adjustment can indicate how a baseline weight is to be adjusted for a predictor pixel when calculating the compound pixel using the predictor pixel. For example, the direction of adjustment can indicate whether to adjust the baseline weight up (i.e., increased in value) or down (i.e., decreased). For example, the direction of adjustment can indicate, for a predictor pixel of a predictor block, whether the baseline weight is to be modulated upward or downward as a characteristic of the predictor pixel increases or decreases. The characteristic, as further described below, can relate to pixel differences, smoothness of a pixel, or can relate to a peak pixel value. The direction of adjustment can indicate whether to increase or decrease the baseline weight as the pixel value differences or the relative smoothness differences increase or decrease between co-located pixels in the first predictor block and a second predictor block.

A complementary mask indicator can indicate that a weight mask {(1−w1), w1} instead of a standard weight mask {w1, (1−w1)} is to be applied to the first predictor block and the second predictor block respectively.

A peak pixel value may indicate how the baseline weights are modulated based on a decaying function. The decaying function can have a maximum value at the peak pixel value that decays as the difference between a pixel value of a predictor block and the peak value increases.

Other details of these dependent compound prediction modes for video coding are described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
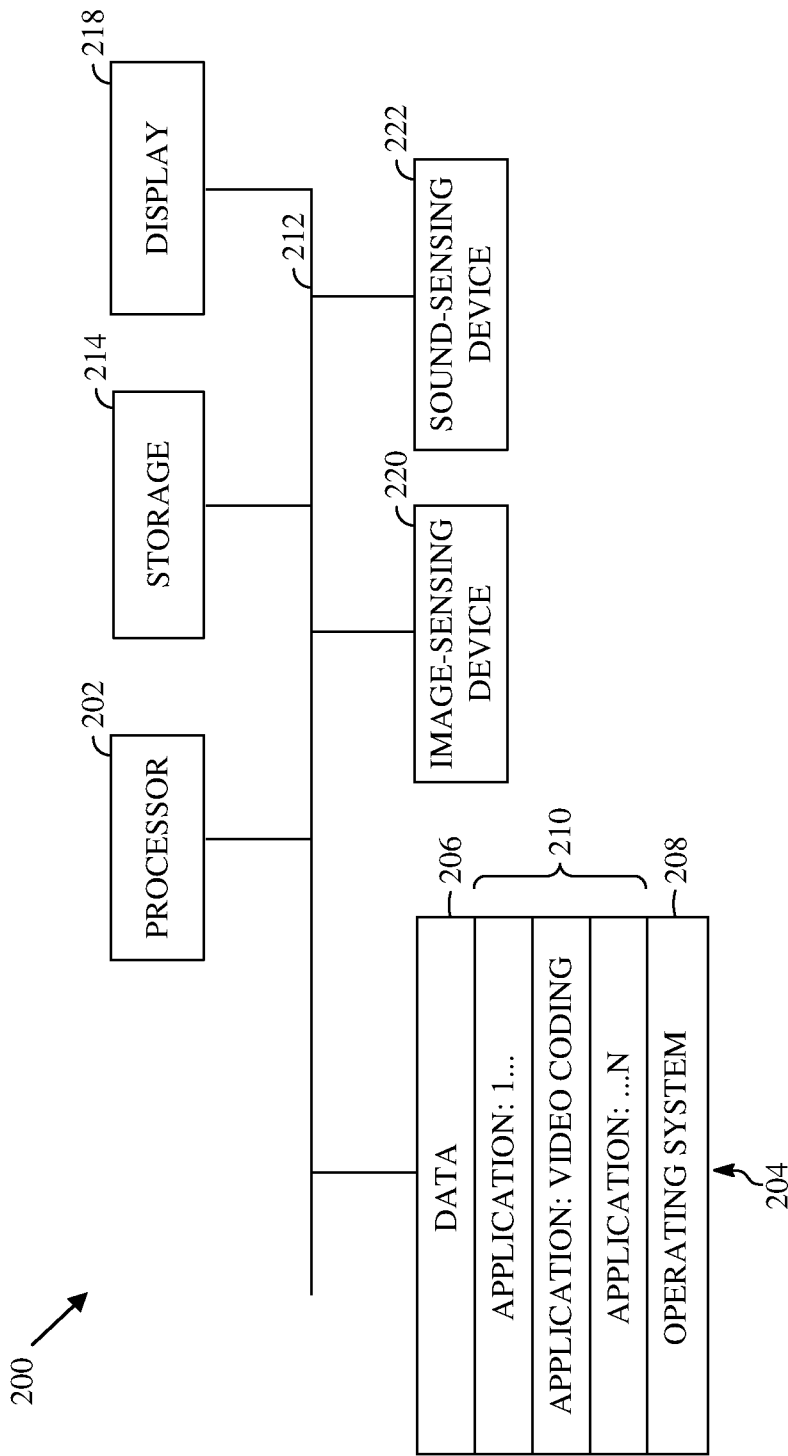
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
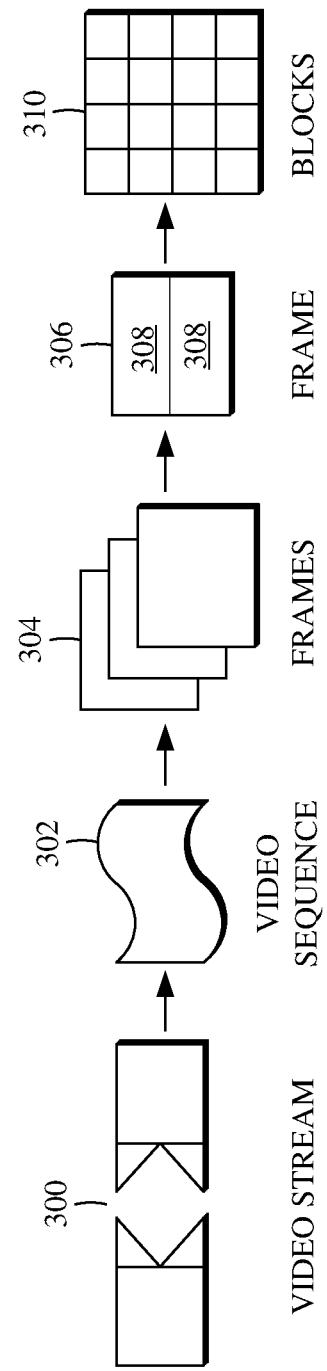
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
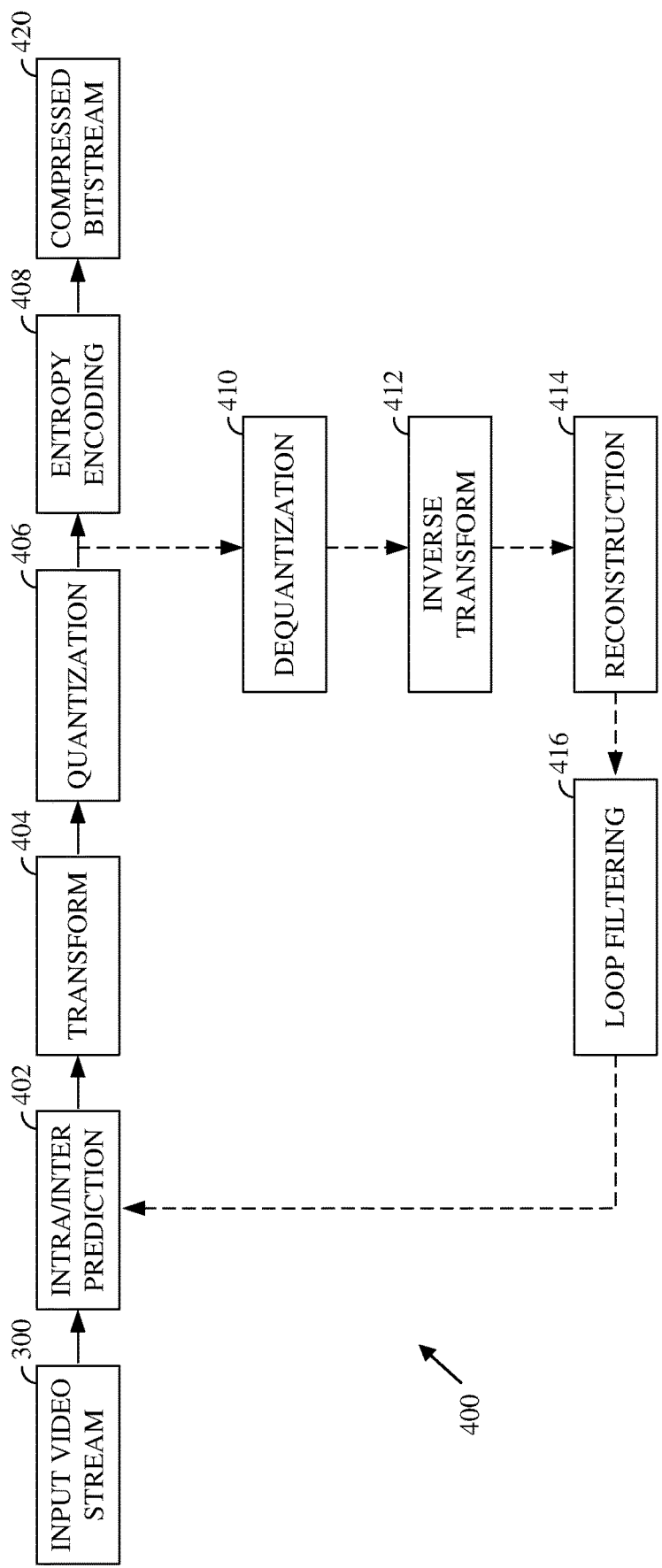
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a predictor block can be formed. In the case of intra-prediction, all or a part of a predictor block may be formed from samples in the current frame that have been previously encoded and reconstructed. In the case of inter-prediction, all or part of a predictor block may be formed from samples in one or more previously constructed reference frames determined using motion vectors.

Next, still referring to FIG. 4, the predictor block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a predictor block, and hence the resulting residual block, may be different from the size of the transform block. For example, the predictor block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the predictor block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
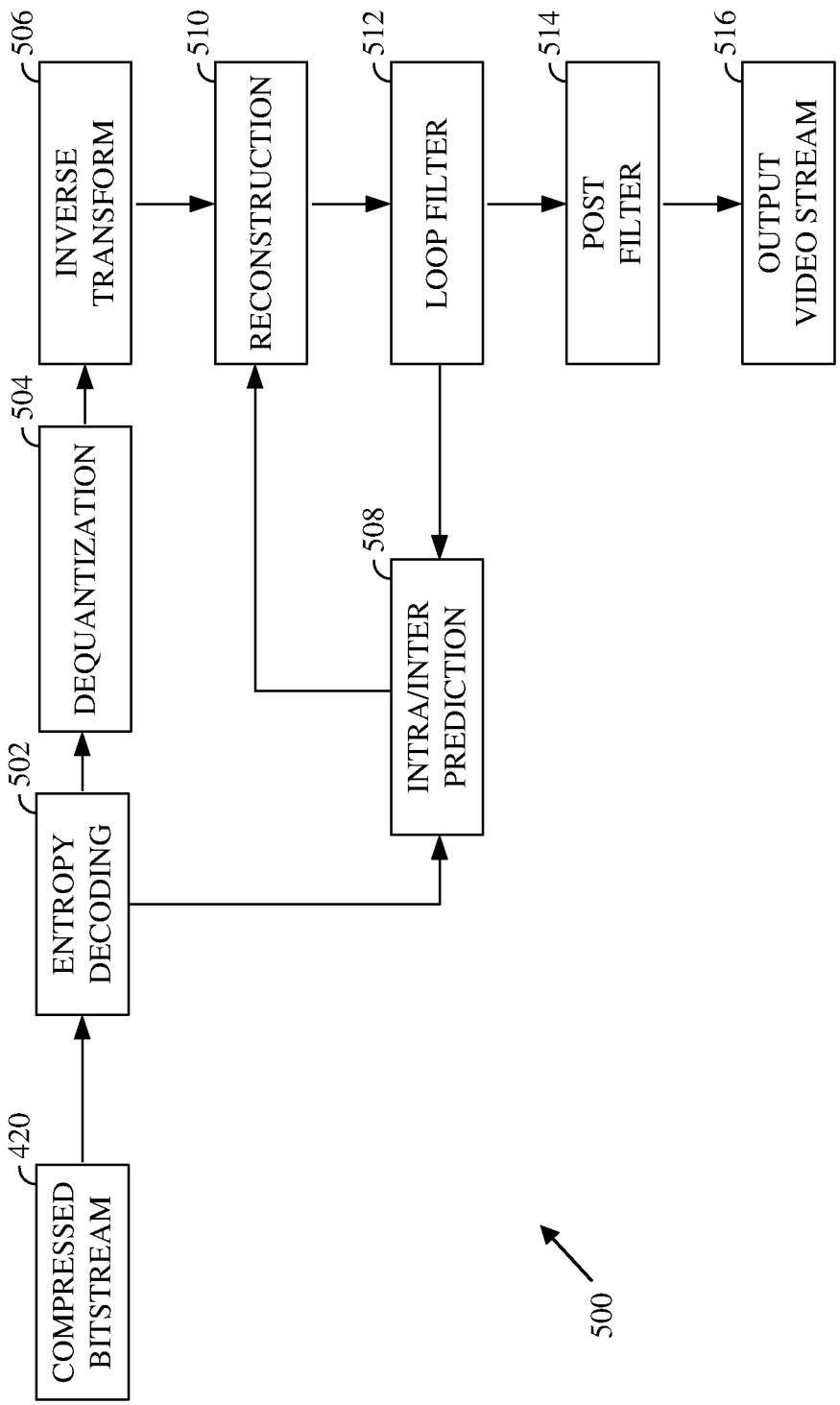
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 6 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/ inter-prediction stage 508 to create the same predictor block as was created in the encoder 400, e.g., at the intra/inter prediction stage 402. At the reconstruction stage 510, the predictor block can be added to the derivative residual to create a reconstructed block. The loop filtering stage 512 can be applied to the reconstructed block to reduce blocking artifacts. Other filtering can be applied to the reconstructed block. In an example, the post filtering stage 514 comprises a deblocking filter that is applied to the reconstructed block to reduce blocking distortion. The result of the post filtering stage 514 is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the filters may be arranged in different orders. Additionally, or alternatively, the encoder 400 includes a deblocking filtering stage in addition to the loop filtering stage 416.

Figure 6:
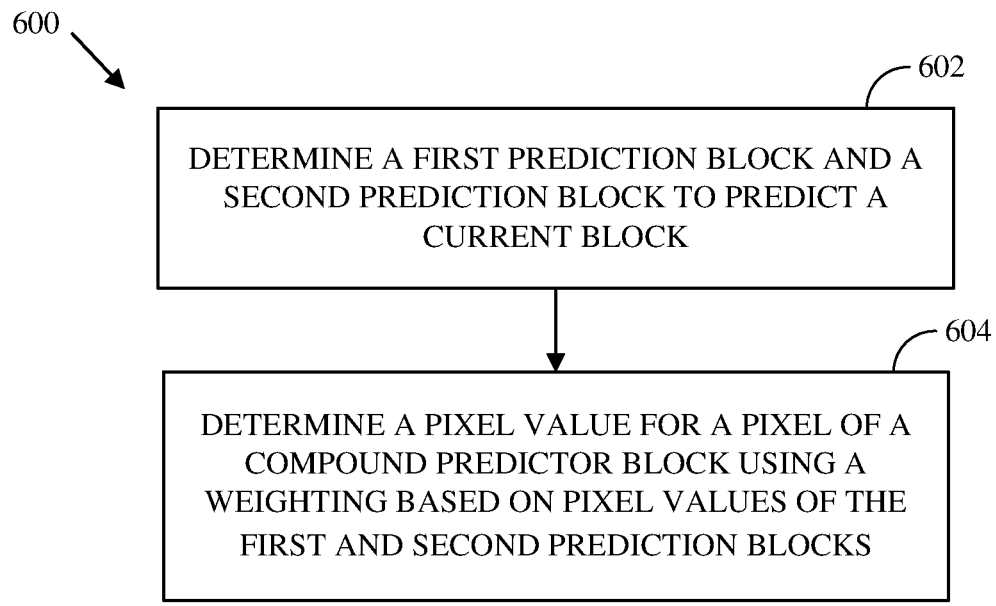
FIG. 6 is a flowchart diagram of a process for compound motion prediction of a current block of pixels according to an implementation of this disclosure.

FIG. 6 is a flowchart diagram of a process 600 for compound motion prediction of a current block of pixels according to an implementation of this disclosure. The process 600 can be implemented in an encoder such as the encoder 400 or a decoder such as the decoder 500.

The process 600 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400 or the intra/inter-prediction stage 508 of the decoder 500.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 600 determines a pixel value for pixel position of the compound predictor block based on a weighting. The weighting can be based on first pixel values of a first predictor block and second pixel values of a second predictor block. The process 600 can determine a respective pixel value for each position of the compound predictor block. In an example, the process 600 determines at least a portion of a compound predictor block as a weighting of pixel values from two or more predictor blocks. The weighting of at least one of the predictor pixels values can be based on pixel values of the pixels in at least one of the predictor blocks.

At 602, the process 600 determines a first predictor block and a second predictor block to predict the current block of pixels. As used herein, "determine" means to select, construct, identify, specify, receive, or determine in any manner whatsoever. For example, when the process 600 is performed by an encoder, the first predictor block and/or the second predictor block may be determined by performing a motion search within respective reference frames to find the best matching predictor blocks for the current block. The first predictor block and/or the second predictor block may be determined by applying one or more intra prediction modes to the current block. In any event, this analysis may be performed as part of a rate-distortion loop in, e.g., the intra/inter prediction stage 402 of the encoder 400, that determines the best prediction mode for prediction of the current block. When the process 600 is performed by a decoder, the first predictor block and the second predictor block may be determined by receiving an identifier of the prediction mode for the current block within an encoded bitstream. The identifier can indicate the prediction mode that was used to encode the current block, optionally with information used for decoding, such as motion vector(s), reference frame(s), etc. For example, the identifier can indicate that the compound prediction mode described herein was used to encode the current block, along with information indicating, e.g., a first motion vector, a second motion vector, and reference frame information as described above with respect to the intra/inter-prediction stage 508 of decoder 500. This information may be used to generate the first predictor block and the second predictor block. While this example describes a compound predictor using inter predictors, the first predictor block and the second predictor block can be any combination of inter+inter predictor blocks, inter+intra predictor blocks, or intra+intra predictor blocks. Any number (e.g., greater than two) of predictor blocks can be determined at 602. The teachings herein apply to any number of predictor blocks.

At 604, the process 600 determines a pixel value for a pixel of the compound predictor block using a weighting that is based on pixel values of the first predictor block and pixel values of the second predictor block. As indicated above, the weightings for pixels depend on the prediction signals themselves. Non-limiting examples of weightings based on first pixel values of the first predictor block and second pixel values are next provided.

To minimize decoder complexity, it is desirable that the weight generation process be a simple one. The weighting for a predictor pixel (i.e., a pixel of the first predictor block or the second predictor block) can be modulated based on a characteristic of the predictor pixel. Examples of characteristics are provided below. Each of the predictor pixels (i.e., the predictor pixels to be combined to form a pixel of the compound predictor, also called a compound pixel) can have a respective characteristic value for the characteristic. For example, in the case of two predictor blocks, a first characteristic value of the characteristic of a first predictor pixel of the first predictor block and a second characteristic value of the characteristic of a co-located second predictor pixel of the second predictor block can be used to modulate the baseline weight. The modulated baseline weights may then be applied to the first predictor pixel and the second predictor pixel of the second predictor block to generate the compound predictor pixel. As indicated above, the first predictor pixel and the second predictor pixel are co-located.

In a first example, the weight generation process proceeds as follows. Given the first predictor block and the second predictor block, and for each pixel position of the compound predictor block, the process 600 determines the characteristic as an absolute difference between co-located pixels in the first predictor block and the second predictor block. The absolute difference can be used to set the weighting. In an implementation, a baseline weight can be modulated (e.g., adjusted, modified, scaled) based on the difference. As such, the weighting is further based on the baseline weight.

Figure 7:
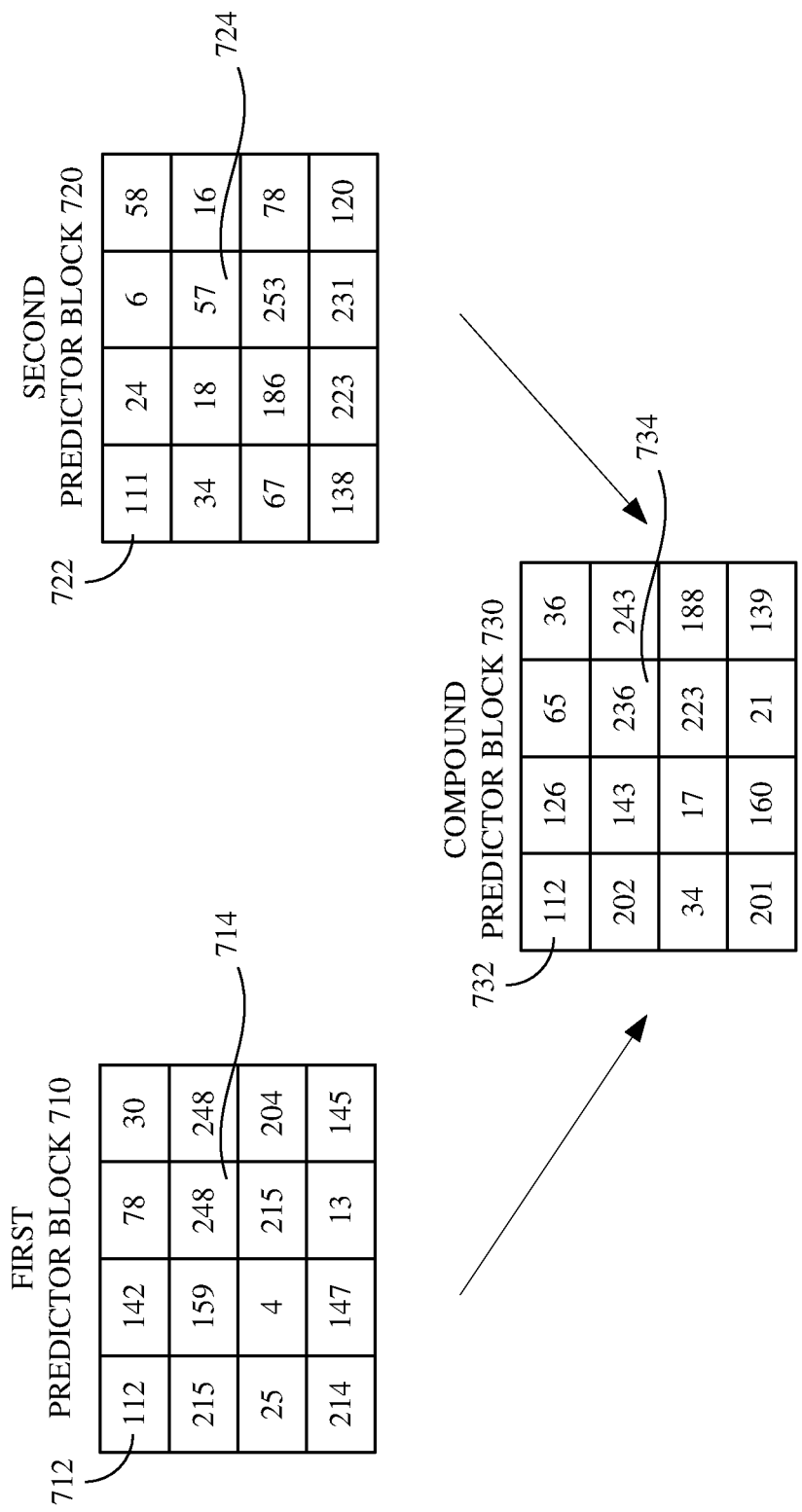
FIG. 7 is an example of using pixel differences for modulating a baseline weight according to implementations of this disclosure.

FIG. 7 is an example of using pixel differences to modulate a baseline weight according to implementations of this disclosure. In this example, the difference between a first pixel of the first predictor block and a second pixel of the second predictor block is the characteristic used to modulate the weighting. The example includes a first predictor block 710, a second predictor block 720, and a compound predictor block 730. A pixel of the compound predictor block 730 is generated by combining co-located pixels of the predictor blocks, here the first predictor block 710 and the second predictor block 720. The pixel values of the compound predictor block 730 are derived based on a weighting of pixel values of the first predictor block 710 and the second predictor block 720. The modulated weight for a pixel located at pixel position (r, c) of the compound predictor block 730 is calculated according to equation (2):

$$\text{modulated}(r, c) = \text{absolute}(p1(r, c) - p2(r, c)) * \frac{(1 - \text{weight})}{\text{maxvalue}} + \text{weight} \quad (2)$$

In equation 2, modulated(r, c) is the weight (i.e., adjusted or modulated baseline weight) to be applied for a pixel value of the compound predictor block at location (r, c). Also in equation 2, p1(r, c) is the pixel value at location (r, c) in the first predictor block, p2(r, c) is the pixel value at location (r, c) in the second predictor block, weight is the baseline weight, and maxvalue is the highest possible pixel value. The pixel values can correspond to luminance or chrominance components of a pixel, for example.

With the modulation function of equation (2), as the difference between the pixel values increases, the first predictor block is weighed more and the baseline weight (weight) approaches 1. Also, as the difference between the pixel values increases, the second predictor block is weighed less (i.e., 1-weight) and the baseline weight of the second predictor block approaches 0. This is so because a positive value is added to the baseline weight (weight) used with the first predictor block. When respective pixels of the first predictor block and the second predictor block have the same value, the baseline weight (weight) (e.g., 0.75) is used for the first predictor block pixel. In some examples, the baseline weight is 0.50. In other examples, the baseline weight is 0.75. Other values may be used for the baseline weight.

The modulation function described with reference to FIG. 7 is but one example of a modulation function. Other functions can be used. For example, another modulation function can adjust the baseline weight (weight) up or down depending on the difference instead of the absolute value of the difference.

The direction of modulation can indicate an up value or a down value. For example, the up value may be indicated with a bit value 0 and the down value may be indicated with a bit value 1. Other indications are possible. When the direction of modulation is the up value, the first baseline weight may be modulated upward with increases of the difference between respective pixel values of the predictor block and the second predictor block. Such a modulation function weights a pixel of the first predictor block higher as the difference increases. When the direction of modulation is the down value, the first baseline weight is modulated downward with the increase of the difference. Such a modulation, in contrast, favors a pixel of the second predictor block—that is, by decreasing the first baseline weight of the first predictor block, the second baseline weight of the second predictor block is correspondingly increased as the sum of the first baseline weight and the second baseline weight is 1. An encoder can add the bit value for the direction of modulation into an encoded bitstream for use by a decoder.

When a baseline weight is indicated in the encoded bitstream, it can be assumed that the corresponding value of the weighting scheme is to be used with the first predictor block. For example, the baseline weight can be selected from a weighting scheme. An example of a weighting scheme includes the baseline weights {0.75, 0.6, 0.5, 0.25}. A weighting scheme is the set of baseline weights that an encoder, a decoder, or an encoder/decoder pair can use. If the two-bit sequence 01 is indicated, then the baseline weight (weight) 0.6 of the weighting scheme is to be used for the first predictor block and the complementary baseline weight 0.4 (i.e., (1-weight)) is to be used with the second predictor block. However, in some instances an encoder may determine that the complementary baseline weight is to be used with the first predictor block. As such, the encoder can encode into the encoded bitstream, for decoding and use by a decoder, a complementary mask indicator (i.e., a syntax element) indicating that the first baseline weight is to be used with the second predictor block and that a second baseline weight (i.e., the complementary baseline weight) is to be used with the first predictor block. For example, if baseline scheme 01 (i.e., decimal value 1) is indicated and the complementary mask signal is indicated, then the weight 0.4 is used with the first predictor block and the weight 0.6 is used with the second predictor block. Alternatively, the weighting scheme may be expanded to include complementary values for all of the baseline weights. For example, a baseline weight of 0.4 could be added to the weighting scheme described above, such that the complementary mask indicator is not used. This, however, could increase the number of bits needed to signal the baseline weight. In the example shown, the number of bits needed to signal a selected baseline weight would increase, e.g., from 2 bits to 3 bits.

In the example of FIG. 7, a value of 0.75 is assumed for the baseline weight (weight) and the highest possible pixel value maxvalue is assumed to be 255. Using the pixel 712 of the first predictor block (i.e., pixel value 112) and the pixel 722 of the second predictor block (i.e., pixel value 111), the modulated weight to be used for pixel 732 at pixel position (0, 0) of the compound predictor block is calculated as follows:

$$\text{modulated}(0, 0) = \text{absolute}(112 - 111) * \frac{(1 - 0.75)}{255} + 0.75 = 0.75098$$

Similarly, using the pixel 714 of the first predictor block (i.e., pixel value 248) and the pixel 724 of the second predictor block (i.e., pixel value 57), the modulated weight to be used for pixel 732 at pixel position (1, 2) of the compound predictor block is calculated as follows:

$$\text{modulated}(1, 2) = \text{absolute}(248 - 57) * \frac{(1 - 0.75)}{255} + 0.75 = 0.937255$$

Using the modulated weights, the pixel values of the compound predictor block are calculated. The equation (1)

can be used to calculate the pixel values. For example, the pixel values for the pixel 732 and the pixel 734 are respectively calculated as:

current(0,0)=112*0.75098+111*(1−0.75098)=112 current(1,2)=248*0.937255+57*(1−0.937255)=236

Note that since pixel values are integer values, calculated pixel values can be either rounded or truncated—in the example above, the calculated values are rounded to the nearest integer.

The baseline weight can be provided to an encoder and to a decoder as a configuration. The baseline weight can be set in the encoder and the decoder. Alternatively, the baseline weight can be provided by the encoder to the decoder in the encoded bitstream. The encoder can encode an index of a baseline weight to be used by the decoder.

Referring again to the weighting scheme {0.75, 0.6, 0.5, 0.25}, the encoder can indicate with 2 bits which baseline weight is to be used. That is, the encoder can indicate an index of a weight from a weighting scheme. The bits 00 can be encoded in the encoded bitstream to indicate the baseline weight 0.75; and the bits 10 can be encoded to indicate that the 0.5 baseline weight is to be used. The baseline weight can indicate the baseline weight to be used for the first predictor block as described above. Accordingly, a decoder can determine that a baseline weight—the complement (1−weight) to weight—is to be used for the second predictor block. As such, the baseline weight indicates a mask for a first baseline weight and a second baseline weight, namely the mask {weight, (1−weight)}. Alternatively, a baseline weight (instead of encoding an index) can be encoded. For example, the weight can be the transmitted coarsely in the bitstream and can take a few distinct values based on the coarse transmission.

In a second example, the smoothness of the each predictor block around each pixel of the predictor block can be used to determine the weighting or to modulate a baseline weight. As such, the characteristic used for modulating the weighting can be a first smoothness about the first pixel of the first predictor block and a second smoothness about the second co-located pixel of the second predictor block.

The smoothness around a pixel can be indicative of noise around the pixel. For example, the higher the smoothness, the lower the noise; and the lower the smoothness, the higher the noise. If the local smoothness around a pixel location of one predictor block is higher than the local smoothness at the same pixel location of the other predictor block, the former predictor block may have a greater weight applied to its pixel value. Alternatively, when a baseline weight is used, the baseline weight for a smoother predictor pixel can be adjusted or modulated upward. The smoothness at a pixel position can be determined by examining the surrounding pixels. For example, smoothness at a pixel position can be determined using, for example, a 3×3 window centered at the pixel position. Any window size can be used. The smoothness around a pixel can be determined using statistics (e.g., range, standard deviation, etc.) of the 3×3 window around the pixel. Other methods for determining the smoothness can be used. The relative values of the first smoothness and the second smoothness can be used to modulate the baseline weights of the predictor blocks. For example, equation 3 can be used to modulate the baseline weights:

$$\begin{cases} modulated1(r, c) = \dfrac{smoothness1(r, c)}{(smoothness1(r, c) + smoothness2(r, c))} \\ \qquad\qquad\qquad\qquad * weight \\ modulated2(r, c) = \dfrac{smoothness2(r, c)}{(smoothness1(r, c) + smoothness2(r, c))} \\ \qquad\qquad\qquad\qquad *(1 - weight) \end{cases} \quad (3)$$

In equation 3, modulated1(r, c) is the modulated weight of a baseline weight (weight) for a first pixel at position (r, c) of the first predictor block, modulated1(r, c) is the modulated weight for a second pixel at position (r, c) of the second predictor block, smoothness1(r, c) is the smoothness at the first pixel position, and smoothness1(r, c) is the smoothness at the second pixel position.

As described with respect to FIG. 7, the baseline weight can be conveyed in the encoded bitstream. The baseline weight can be selected from a weighting scheme. A direction of modulation, as described with respect to FIG. 7, can also be encoded by an encoder for later decoding and use by a decoder. A complementary mask indicator, as described with respect to FIG. 7, can also be encoded by an encoder for later decoding and use by a decoder.

In a third example, one (or more) peak pixel values for each predictor block can be used to determine modulation values. In an example, one peak value can be transmitted by the encoder for each predictor block of the compound prediction. The peak values can be encoded by the encoder using low precision (i.e., coarse approximations of the peak values). For example, the peak values can be gray scale pixel values communicated with a small number of bits (e.g., 2 or 3 bits). This embodiment can be useful when one color is better predicted from one predictor block than another predictor block. For a predictor block, a predictor pixel that is closer in value to the peak value can be weighted more than predictor pixels that are farther in value from the peak value.

The modulated weight for a pixel position of a predictor block can be obtained by a function that has a maximum value when a pixel value is equal or approximately equal to the peak value and decays as the difference between the pixel value and the peak pixel value increases. If a first pixel value of the first predictor block is closer (i.e., approximately equal in value) to the peak pixel value of the first predictor block than a co-located second pixel value of the second predictor block, then it can be assumed that the first predictor is a more accurate predictor for the pixel of the current block than the second predictor block.

The final weighting for determining the value of a pixel of the compound predictor block can be obtained using the relative weighting of the weights using equation (4):

$$current(r, c) = p1(r, c) * \dfrac{w1}{(w1 + w2)} + p2(r, c) * \dfrac{w2}{(w1 + w2)} \quad (4)$$

In equation (4), and depending on the implementation, the weights can be the baseline weights (i.e., unmodulated weights) or can be modulated weights. That is, in an implementation that uses modulation values and/or functions to module the weights, the modulated weights are used in equation (4); otherwise, unmodulated weights are used. As such, in equation (4), w1 and w2 can be the modulated baseline weights as determined using the described decaying function or any other modulation value and/or function, including those described below; p1(r, c) and p2(r, c) are, respectively, the pixel value at position (r, c) of the first predictor block and the second predictor block; and current (r, c) is the pixel at position (r, c) of the compound predictor block.

As described above, the process 600 can include decoding a baseline weight such that the weighting can be further based on the baseline weight. The baseline weight can indicate a mask including a first baseline weight and a second baseline weight. The first baseline weight can be used with the first prediction block and the second baseline weight can be used with the second prediction block. The baseline weight can indicate a weight from a weighting scheme including the weights 0.75, 0.6, 0.5, and 0.25. As described above, the weighting can be modulated based on a characteristic of a first pixel of the first prediction block and a co-located second pixel of the second prediction block. The characteristic can be a difference between the first pixel of the first prediction block and the second pixel of the second prediction block. The characteristic can be a first smoothness about the first pixel and a second smoothness about the second pixel. Also, as described above, the process 600 can decode a complementary mask indicator and, based on the complementary mask indicator, can use the first baseline weight with the second prediction block and use the second baseline weight used with the first prediction block.

As described above, the process 600 can decode a direction of modulation having an up value or a down value. When the direction of modulation is the up value, the first baseline weight is modulated upward with an increase of the difference. When the direction of modulation is the down value, the first baseline weight is modulated downward with the increase of the difference.

In an implementation, determining a pixel value for a pixel of the current block of pixels using a weighting that is based on pixel values of the first prediction block and pixel values of the second prediction block can include identifying a first peak value for the first prediction block, determining a first weight for a first pixel of the first prediction block, and determining the pixel value based on at least the first weight and the first pixel.

Figure 8:
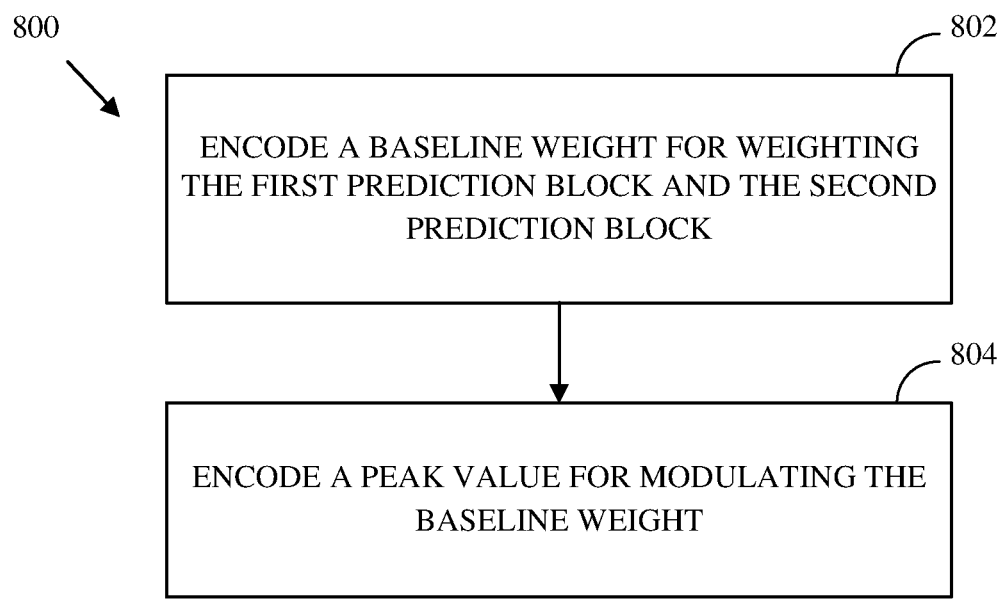
FIG. 8 is a flowchart diagram of a process for compound prediction using a first predictor block and a second predictor block to predict a current block of pixels according to an implementation of this disclosure.

FIG. 8 is a flowchart diagram of a process 800 for compound prediction using a first predictor block and a second predictor block to predict a current block of pixels according to an implementation of this disclosure. The process 800 can be implemented in an encoder such as the encoder 400.

The process 800 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 800. In at least some implementations, the process 800 can be performed in whole or in part by the intra/inter prediction stage 402 of the encoder 400. The process 800 can be implemented using specialized hardware or firmware. Some computing devices can have multiple memories, multiple processors, or both. The steps or operations of the process 800 can be distributed using different processors, memories, or both.

The process 800 can receive or determine a first predictor block and a second predictor block. Any number of predictor blocks can be used—not only a first predictor block and a second predictor block.

At 802, the process 800 encodes a baseline weight, such as the baseline weight described above. At 804, the process 800 encodes a peak value for the first predictor block. The peak value and a first pixel value of the first predictor block modulate the baseline weight to produce a co-located pixel value of the compound predictor block of pixels. The peak value is as described with respect to the third example above.

The process 800 can also include encoding a direction of modulation of the baseline weight. The process 800 can also include encoding an indication to use a complementary mask. In response to the indication being a first value, a decoder uses a first baseline weight with the first predictor block and uses a second baseline weight used with the second predictor block. In response to the indication being a second value, a decoder uses the first baseline weight with the second predictor block and uses the first baseline weight used with the second predictor block. A sum of the first baseline weight and the second baseline weight may be equal to one (1). The direction of modulation and the indication to use a complementary mask are as described above with respect to FIG. 7.

Figure 9:
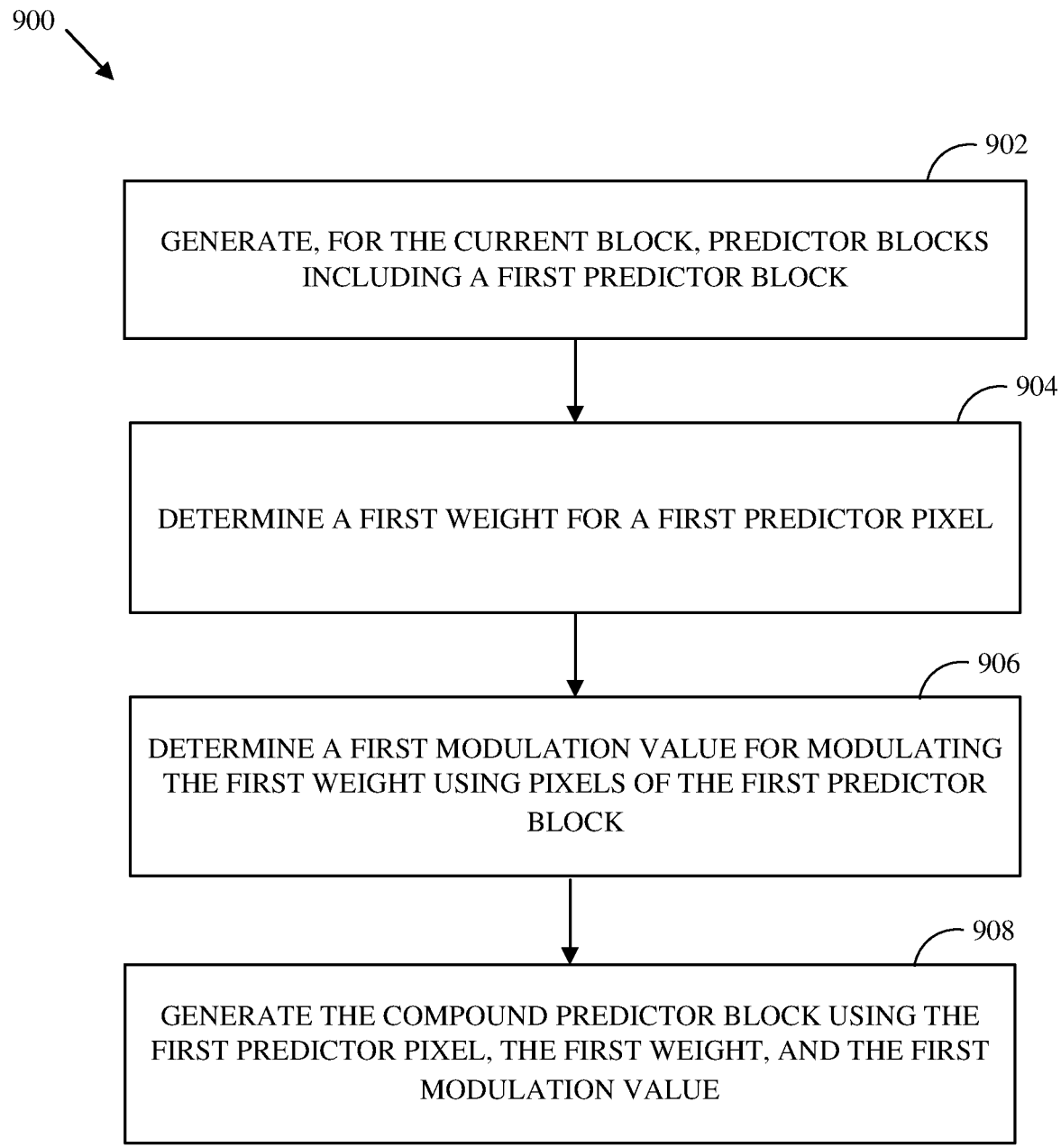
FIG. 9 is a flowchart diagram of a process for generating a compound predictor block of a current block of video according to a second implementation of this disclosure.

FIG. 9 is a flowchart diagram of a process 900 for generating a compound predictor block of a current block of video according to a second implementation of this disclosure. The process 900 can be implemented in an encoder such as the encoder 400 or a decoder such as the decoder 500.

The process 900 can be implemented, for example, as a software program that can be executed by computing devices such as transmitting station 102 or the receiving station 106. The software program can include machine-readable instructions that can be stored in a memory such as the memory 204 or the secondary storage 214, and that can be executed by a processor, such as CPU 202, to cause the computing device to perform the process 900. In at least some implementations, the process 900 can be performed in whole or in part by the intra/inter prediction stage 402 of the encoder 400 and/or by the intra/inter-prediction stage 508 of the decoder 500.

The process 900 can be implemented using specialized hardware or firmware. Some computing devices can have multiple memories, multiple processors, or both. The steps or operations of the process 900 can be distributed using different processors, memories, or both.

At 902, the process 900 generates predictor blocks for a current block. The predictor blocks can be generated as described above with respect to the process 600. The predictor blocks can include at least a first predictor block.

At 904, the process 900 determines, for a first predictor pixel of the first predictor block, a first weight. The first weight may be determined by selecting a weight from a weighting scheme. The weighting scheme may include the weights 0.75, 0.6, 0.5, and 0.25, or other weights. When implemented by an encoder, some or all of the weights of the weighting scheme may be selected in turn (e.g., within a rate-distortion loop) to generate compound predictor blocks with regard to the process 900 as described below, and the encoder can select the best weight. The encoder can encode the first weight in an encoded bitstream, such as the compressed bitstream 420 of FIG. 4. When implemented by a decoder, the process 900 can determine the first weight by decoding the first weight from the encoded bitstream, such as described with regard to FIG. 5. The process 900 can code (i.e., encode when implemented by an encoder and decode when implemented by a decoder) the first weight by encoding an index of weight mask. The process 900 can code the first weight by encoding a coarse value of the first weight.

At 906, the process 900 includes determining a first modulation value for modulating the first weight. The first modulation value may be determined using at least a subset of predictor pixels of the first predictor block.

In an example, and as described above, the first modulation value can be determined using a decaying function that has a maximum value at a defined pixel value of the first predictor block. The first prediction pixel can be input to the decaying function to determine the first modulation value. Other prediction pixels of the first prediction block may also be used as input to the decaying function to determine modulation values for those pixels. In an example, and as described above, the first modulation value can be determined based on a difference between the first predictor pixel and the second predictor pixel. In an example, and as described above, the first modulation value can be determined using a smoothness in a window around the first prediction pixel. The window can be a window centered at the first prediction pixel and is of size 3×3. Other ways for determining the first modulation value, including combining the above-described, or other, modulation values and/or functions can be available.

At 908, the process 900 generates the compound predictor block using the first predictor pixel, the first weight, and the first modulation value.

In an example, the predictor blocks include a second predictor block. Generating the compound predictor block using the first predictor pixel and the first modulation value can include, for a co-located pixel within the second predictor block, using a second modulation value for modulating a complement of the first weight. The second modulation value can be determined using at least a subset of the second predictor pixels. The second modulation value can be determined as described above with respect to the first modulation value. The compound predictor block can be generated, using the modulated first weights and the modulated complement of the first weights, as described with respect to equation (4).

In some implementations of the process 900, the first weight and/or the complement of the first weight are not modulated. As such, an implementation of the process may not include the block 906 such that the first weight and the complement of the first weight are used without being modulated in equation (4).

Figure 10:
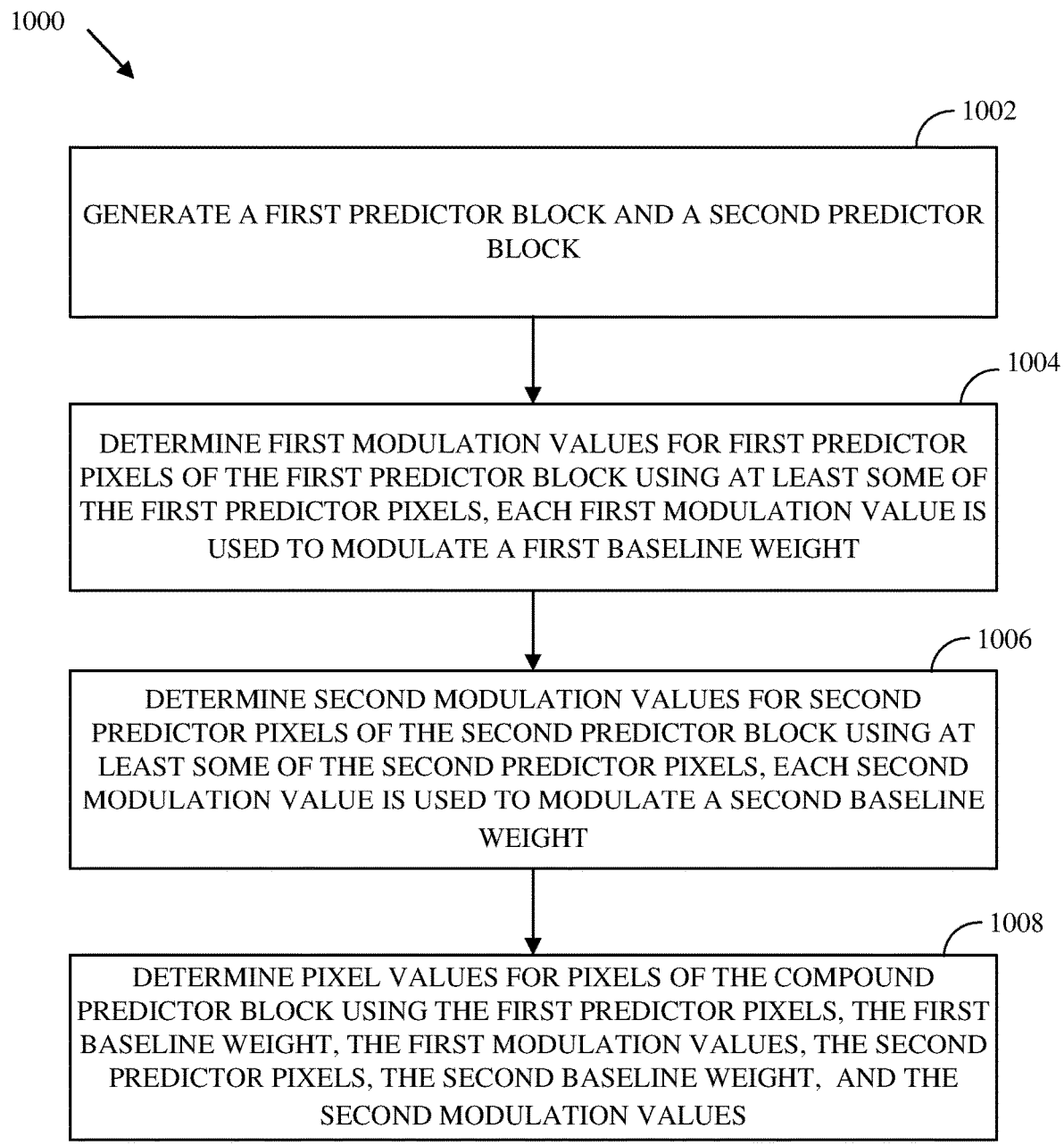
FIG. 10 is a flowchart diagram of a process for generating a compound predictor block according to a third implementation of this disclosure.

FIG. 10 is a flowchart diagram of a process 1000 for generating a compound predictor block according to a third implementation of this disclosure. The process 1000 can be implemented by an encoder or a decoder as described with respect to the process 900. The process 1000 can be implemented as a software program as described with respect to the process 900. The process 1000 can be implemented using specialized hardware or firmware as described with respect to the process 900.

At 1002, the process 1000 generates a first predictor block and a second predictor block. The first predictor block includes first predictor pixels. The second predictor block includes second predictor pixels. The predictor blocks may be generated as discussed previously.

At 1004, the process 1000 determines respective first modulation values for respective first predictor pixels of the first predictor block. Each first modulation value may be determined using at least some of the first predictor pixels according to techniques previously discussed. Each first modulation value can be used to modulate a first baseline weight. A first modulation value for one pixel of the first predictor pixels can be different from another modulation value for a second pixel of the first predictor pixels. The first baseline weight can be used for the first predictor pixels as described above. In an example, the first baseline weight can be a fixed value that is known to the encoder and the decoder.

At 1006, the process 1000 determines a second modulation value for respective second predictor pixels of the second predictor block. Each second modulation value may be determined using at least some of the second predictor pixels according to techniques previously described. Each second modulation value can be used to modulate a second baseline weight. The second baseline weight can be used for the second predictor pixels as described above. In an example, the second baseline weight can be a fixed value that is known to the encoder and the decoder. In an example, the second baseline weight can be determined from the first baseline weight. For example, the second baseline weight can be the complement of the first baseline weight.

In an example of the process 1000, the first modulation value for a first predictor pixel and the second modulation value for a second predictor pixel can be based on a characteristic of the first predictor pixel and the second predictor pixel. The first predictor pixel and the second predictor pixel are co-located. In an example, the characteristic can be a difference between the first predictor pixel and the second predictor pixel. The difference can be the absolute difference. In an example, the characteristic can be a first smoothness about the first predictor pixel and a second smoothness about the second predictor pixel. In an example, more than one characteristic can be combined. For example, the mask weights can be modulated based on any combination of pixel difference, smoothness, peak values, or any other characteristic.

At 1008, the process 1000 determines pixel values for pixels of the compound predictor block using the first predictor pixels, the first baseline weight, the first modulation values, the second predictor pixels, the second baseline weight, and the second modulation values. For example, the process 1008 can use equation (4) to determine the pixel values for each pixel of the compound predictor block.

In an example, the process 1000 can decode, from an encoded bitstream, a baseline weight. The baseline weight can indicate a mask including a first baseline weight and a complement of the first baseline weight. In an example, each first modulation value can be used to modulate the first baseline weight and each second modulation value can be used to modulate the complement of the first baseline weight. The baseline weight can indicate a weight from a weighting scheme that includes the weights 0.75, 0.6, 0.5, and 0.25 according to the illustrated example.

In an example, the process 1000, when implemented by a decoder, includes decoding a complementary mask indicator. Based on the complementary mask indicator, the process 1000 can modulate the complement of the first baseline weight using each first modulation value and modulate the first baseline weight using each second modulation value.

The process 1000 can also include selecting a direction of modulation having an up value or a down value. When the direction of modulation is the up value, the first baseline weight is modulated upward with an increase of the characteristic. When the direction of modulation is the down value, the first baseline weight is modulated downward with the increase of the characteristic.

In some implementations of the process 1000, the first baseline weight and the second baseline weight as not modulated. As such, the blocks 1004 and 1006 can be omitted from the process 1000 and the block 1008 can be modified to omit using the first modulation values and the second modulation values.

Figure 11:
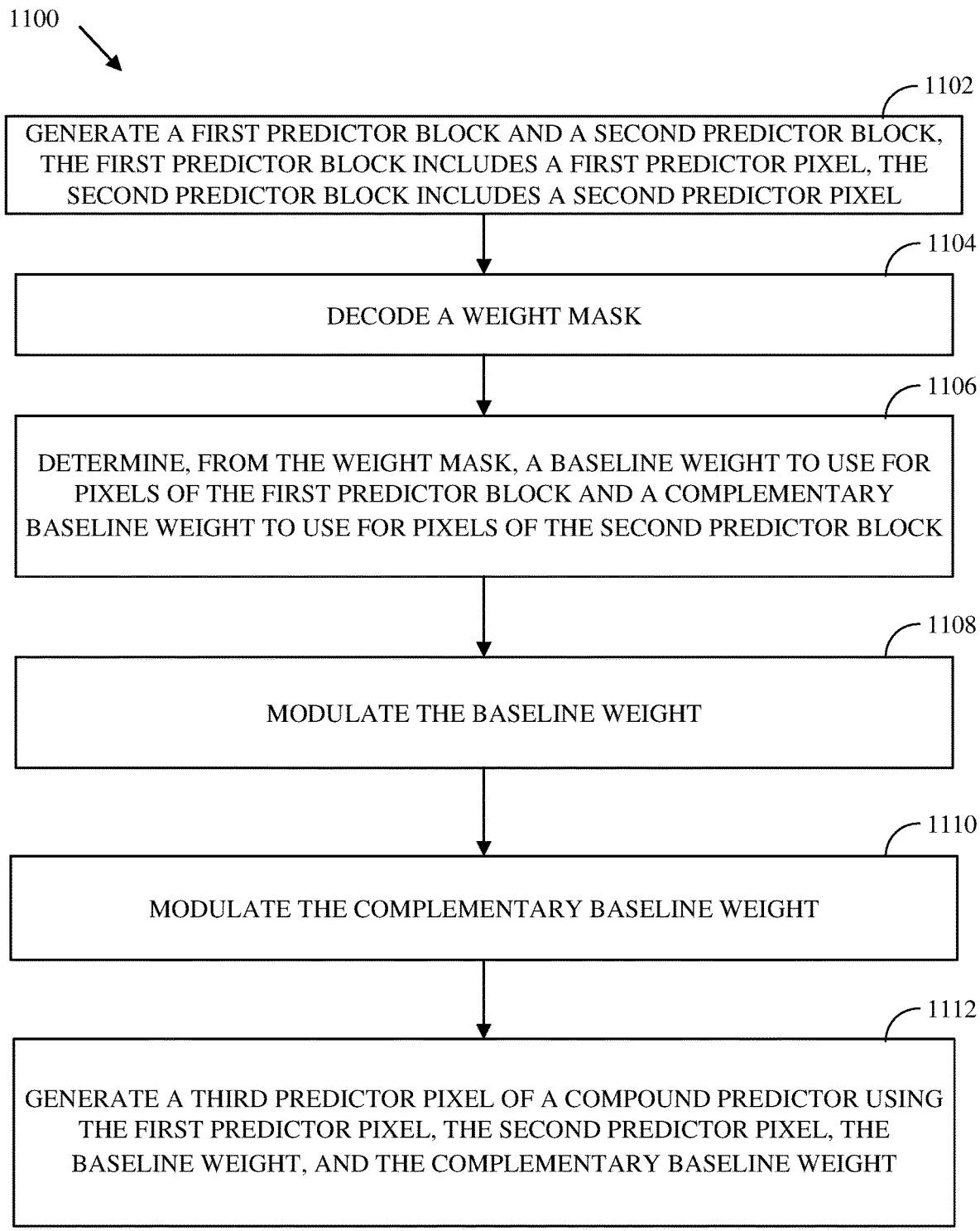
FIG. 11 is a flowchart diagram of a process for decoding a current block according to a second implementation of this disclosure.

FIG. 11 is a flowchart diagram of a process 1100 for decoding a current block according to a fourth implementation of this disclosure. The process 1100 generates a compound prediction block for a current block.

The process 1100 may be performed by a decoder such as the decoder 500. The process 1100 can be implemented, for example, as a software program that can be executed by computing devices such as the receiving station 106. The process 1100 can be performed in whole or in part by the intra/inter-prediction stage 508 of the decoder 500. Implementations of the process 1100 can be performed by storing instructions in a memory such as the memory 204 of the receiving station 106 to be executed by a processor such as CPU 202, for example.

The process 1100 can be implemented using specialized hardware or firmware. Some computing devices can have multiple memories, multiple processors, or both. The steps or operations of the process 1100 can be distributed using different processors, memories, or both.

At 1102, the process 1100 generates a first predictor block and a second predictor block. For example, the first predictor block and the second predictor block may be generated using one or more inter prediction modes, one or more intra prediction modes, or combinations of inter and intra prediction modes used to encode a current block. The prediction modes, and any information needed for prediction using the prediction mode (e.g., motion vector(s)) may be decoded from an encoded bitstream, such as the compressed bitstream 420 of FIG. 5. The first predictor block includes a first predictor pixel. The second predictor block includes a second predictor pixel.

At 1104, the process 1100 decodes a weight mask from the encoded bitstream. At 1106, the process 1100 determines, from the weight mask, a baseline weight to use as a first weight for pixels of the first predictor block and a complementary baseline weight to use as a second weight for pixels of the second predictor block. Weight masks, baseline weights, and complementary baseline weights are described previously.

At 1108, the process 1100 can modulate the baseline weight for a first predictor pixel of the first predictor block. The process 1100 can modulate the baseline weight using at least some of the pixels of the first predictor block. The baseline weight can be modulated using a modulation value and/or function as described previously.

At 1110, the process 1100 can modulate the complementary baseline weight for a second predictor pixel of the second predictor block. The process 1100 can modulate the complementary baseline weight using at least some of the pixels of the second predictor block. The complementary baseline weight can be modulated using a modulation value and/or function as described previously. The second predictor pixel is co-located with the first pixel predictor.

At 1112, the process 1100 generates a third predictor pixel of a compound predictor using the first predictor pixel, the second predictor pixel, the baseline weight, and the complementary baseline weight. For example, the third predictor pixel can be the pixel 734 of the compound predictor block 730 of FIG. 7, the first predictor pixel can be the pixel 714 of the first predictor block 710 of FIG. 7, and the second predictor pixel can be the pixel 724 of the second predictor block 720 of FIG. 7. The process 1100 can generate the third predictor pixel as described with respect to equation (4).

In some implementations, the process 1100 does not modulate the first baseline weight and the second baseline weight. As such, the process 1100 omits the blocks 1108 and 1110 and, accordingly, at block 1112 the unmodulated baseline weight and unmodulated complement of the baseline weight are used.

In an example where the baseline weight has a first value and the complementary baseline weight has a second value, the process 1100 can include decoding an indication to use a complementary mask, and, in response to the indication to use a complementary mask being a first value, using the second value as a value of the baseline weight and using the first value as a value of the complementary baseline weight. The first value and the second value can add up to 1.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for generating a compound predictor block for a current block of video, comprising:
   generating, for the current block, a first predictor block using one of inter-prediction or intra-prediction,
      wherein the first predictor block includes respective first predictions for pixels of the current block,
      wherein the first predictor block includes a first pixel located in the first predictor block at a position (r, c), wherein r indicates a row number and c indicates a column number,
      wherein the current block has a size of M×N and includes pixels at positions (m, n) where m=0, . . . , M-1 and n=0, . . . , N-1,
      wherein the first predictor block has the size M×N and includes, for each pixel at a position (m, n) of the current block, a corresponding prediction pixel at the position (m, n) of the first predictor block, and
      wherein the first predictor block is different from the current block;
   generating, for the current block, a second predictor block that includes a second pixel that is located in the second predictor block at the position (r, c),
      wherein the second predictor block includes respective second predictions for pixels of the current block,
      wherein the second predictor block has the size M×N and includes, for each pixel at the position (m, n) of the current block, a corresponding prediction pixel at the position (m, n) of the first predictor block, and
      wherein the second predictor block is different from the first predictor block and from the current block;
   determining a first weight for the first pixel using a difference between a value of the first pixel and a value of the second pixel;
   determining a second weight for the second pixel using the first weight; and
   generating the compound predictor block by combining the first predictor block and the second predictor block, wherein the compound predictor block comprises a weighted pixel that is determined using a weighted sum of the first pixel and the second pixel using the first weight and the second weight.

2. The method of claim 1, wherein the first weight is determined by steps comprising multiplying an absolute value of the difference by a first constant to obtain a result and adding a second constant to the result.

3. The method of claim 2, wherein the first constant is calculated as a ratio having a numerator obtained using a baseline weight and a denominator obtained using a highest possible pixel value.

4. The method of claim 3, wherein the second constant is equal to the baseline weight.

5. The method of claim 1, wherein the second weight is determined as 1 minus the first weight.

6. The method of claim 1, further comprising:
   decoding, from a compressed bitstream, a prediction mode indicative of obtaining the compound predictor block using the difference.

7. The method of claim 1, further comprising:
   encoding, in a compressed bitstream, a prediction mode indicative of obtaining the compound predictor block using the difference.

8. An apparatus for generating a compound predictor block for a current block, comprising:
   a processor configured to:
      generate, for the current block, a first predictor block,
         wherein the first predictor block includes respective first predictions for pixels of the current block,
         wherein the first predictor block includes a first pixel located in the first predictor block at a position (r, c), wherein r indicates a row number and c indicates a column number,
         wherein the current block has a size of M×N and includes pixels at positions (m, n) where m=0, . . . , M-1 and n=0, . . . , N-1,
         wherein the first predictor block has the size M×N and includes, for each pixel at a position (m, n) of the current block, a corresponding prediction pixel at the position (m, n) of the first predictor block, and
         wherein the first predictor block is different from the current block;
      generate, for the current block, a second predictor block,
         wherein the second predictor block includes a second pixel that is located in the second predictor block at the position (r, c),
         wherein the second predictor block includes respective second predictions for pixels of the current block,
         wherein the second predictor block has the size M×N and includes, for each pixel at the position (m, n) of the current block, a corresponding prediction pixel at the position (m, n) of the first predictor block, and wherein the second predictor block is different from the first predictor block and from the current block;

determine a first weight for the first pixel using a difference between a value of the first pixel and a value of the second pixel;

determine a second weight for the second pixel using the first weight; and generate the compound predictor block by combining the first predictor block and the second predictor block, wherein the compound predictor block comprises a weighted pixel that is determined using a weighted sum of the first pixel and the second pixel using the first weight and the second weight, respectively.

9. The apparatus of claim 8, wherein the first weight is determined by steps comprising multiplying an absolute value of the difference by a first constant to obtain a result and adding a second constant to the result.

10. The apparatus of claim 9, wherein the first constant is calculated as a ratio having a numerator obtained using a baseline weight and a denominator obtained using a highest possible pixel value.

11. The apparatus of claim 10, wherein the second constant is equal to the baseline weight.

12. The apparatus of claim 8, wherein the second weight is determined as 1 minus the first weight.

13. The apparatus of claim 8, wherein the processor is further configured to:

decode, from a compressed bitstream, a prediction mode indicative of obtaining the compound predictor block using the difference.

14. The apparatus of claim 8, wherein the processor is further configured to:

encode, in a compressed bitstream, a prediction mode indicative of obtaining the compound predictor block using the difference.

15. A non-transitory computer-readable storage medium, comprising executable instructions that, when executed by a processor, facilitate performance of operations, comprising:

generating, for a current block, a first predictor block, wherein the first predictor block is generated using one of inter-prediction or intra-prediction, wherein the first predictor block includes respective first predictions for pixels of the current block, wherein the first predictor block includes a first pixel located in the first predictor block at a position (r, c), wherein r indicates a row number and c indicates a column number, wherein the first predictor block is different from the current block, wherein the current block has a size of M×N and includes pixels at positions (m, n) where m=0, ..., M-1 and n=0, ..., N-1, and wherein the first predictor block has the size M×N and includes, for each pixel at a position (m, n) of the current block, a corresponding prediction pixel at the position (m, n) of the first predictor block;

generating, for the current block, a second predictor block, wherein the second predictor block includes respective second predictions for pixels of the current block, wherein the second predictor block includes a second pixel that is located in the second predictor block at the position (r, c), wherein the second predictor block has the size M×N and includes, for each pixel at the position (m, n) of the current block, a corresponding prediction pixel at the position (m, n) of the first predictor block, and wherein the second predictor block is different from the first predictor block and from the current block;

determining a first weight for the first pixel using a difference between a value of the first pixel and a value of the second pixel;

determining a second weight for the second pixel using the first weight; and generating a compound predictor block by combining the first predictor block and the second predictor block, wherein the compound predictor block comprises a weighted pixel that is determined using a weighted sum of the first pixel and the second pixel using the first weight and the second weight, respectively.

16. The non-transitory computer-readable storage medium of claim 15, wherein the first weight is determined by steps comprising multiplying an absolute value of the difference by a first constant to obtain a result and adding a second constant to the result.

17. The non-transitory computer-readable storage medium of claim 16, wherein the first constant is calculated as a ratio having a numerator obtained using a baseline weight and a denominator obtained using a highest possible pixel value.

18. The non-transitory computer-readable storage medium of claim 17, wherein the second constant is equal to the baseline weight.

19. The non-transitory computer-readable storage medium of claim 17, wherein the baseline weight is obtained from a weighting scheme comprising weights 0.75, 0.6, 0.5, and 0.25.

20. The non-transitory computer-readable storage medium of claim 15, further comprising:

decoding, from a compressed bitstream, a prediction mode indicative of obtaining the compound predictor block using the difference.

* * * * *